United States Patent [19]

Kawano et al.

[11] Patent Number: 5,080,389
[45] Date of Patent: Jan. 14, 1992

[54] VEHICLE SUSPENSION

[75] Inventors: Shinji Kawano, Yokohama; Hiroshi Tonomura; Yoshihiro Kawabe, both of Yokosuka; Moritsune Nakata, Yokohama, all of Japan

[73] Assignees: Nissan Motor Co.; Yorozu Corporation, Japan

[21] Appl. No.: 580,567

[22] Filed: Sep. 11, 1990

[30] Foreign Application Priority Data

Sep. 13, 1989 [JP] Japan ............... 1-238950

[51] Int. Cl.⁵ ............................................. B60G 5/00
[52] U.S. Cl. ............................... 280/667; 280/670; 280/696; 280/701; 280/724
[58] Field of Search ............... 280/666, 667, 670, 696, 280/701, 724, 710

[56] References Cited

U.S. PATENT DOCUMENTS

| | | | |
|---|---|---|---|
| 2,282,025 | 5/1942 | Borjeson | 280/666 |
| 4,871,187 | 10/1989 | Schaible | 280/696 |

FOREIGN PATENT DOCUMENTS

| | | | |
|---|---|---|---|
| 61-181708 | 8/1986 | Japan | 280/701 |
| 62-218209 | 9/1987 | Japan . | |
| 641612 | 1/1989 | Japan . | |
| 6441408 | 2/1989 | Japan . | |
| 6441409 | 2/1989 | Japan . | |
| 6441410 | 2/1989 | Japan . | |
| 6441411 | 2/1989 | Japan . | |
| 1-306387 | 12/1989 | Japan | 280/696 |
| 2178707 | 2/1987 | United Kingdom | 280/696 |

OTHER PUBLICATIONS

"ATZ 88 (1986) 7/8", p. 409.
"Motor Fan", Jun. 1987, p. 81.

Primary Examiner—Kenneth R. Rice
Attorney, Agent, or Firm—Leydig, Voit & Mayer

[57] ABSTRACT

A bell crank is pivotally mounted on a suspension link. One end of the bell crank is connected with an essentially horizontal shock absorber while the other is connected with a pull rod. As the road wheel undergoes vertical displacement the bell crank rotates while also undergoing vertical displacement along with the link it is mounted on. The lever ratio established between the shock absorber and the link thus changes.

8 Claims, 5 Drawing Sheets

VEHICLE SUSPENSION

BACKGROUND OF THE INVENTION

1. Field of the Invention

The present invention relates generally to vehicle suspension and more specifically to a front suspension which enables a reduction in the height of the front of the vehicle.

2. Description of the Prior Art

FIGS. 6 to 9 show examples of suspensions currently used in racing machines (disclosed in Motor Fan issue 81 published in June of 1987). In these types of suspension it is preferred to set the lever ratio defined between stroke of the spring 2 and the stroke of the shock-absorbed 3, close to or greater than 1.0.

the most recently used of these types of suspensions are the pull rod and push rod types shown in FIGS. 8 and 9.

FIG. 10 shows a double wishbone type front suspension arrangement of the type disclosed in the automotive magazine ATZ 88 (1986) July/August issue No. 409 wherein the spring is arranged about the shock absorber 6 and the latter is connected at its lower end to an upper link 7. In this arrangement the lever ratio which is defined by L2/L1 is about 0.7.

However, with this type of front suspension, if it is used in normal automotive vehicles the upper end of the shock absorber is located at a relatively high position and as result it is very difficult to lower the level of the hood. The reason for this is that in actual practice, the maximum of the shock absorber is about 215 mm+2×(bound stroke)+(rebound stroke). In racing cars the bound/rebound stroke is set about 50/50 (mm) while in normal type vehicles it is set at about 100/100 (mm). Accordingly, if this arrangement is used in normal type vehicles, the shock absorber is subject to abnormal elongation and again the level of the hood cannot be lowered in the required manner.

With the pull rod type arrangement shown in FIG. 8 the shock absorber 3, pull rod 4 and the bell crank lever 5 are arranged so as to attenuate the generation of horizontally acting moments at each of the pivots involved. However, in the case of a front wheel or four wheel drive, the drive shaft (not shown) it is necessary to make room for the shaft and arrange the pull rod either forward or aft of the drive shaft. Under these circumstances the reaction of the shock absorber, which is transmitted through the pull rod to the upper link, subjects the latter to a bias which acts in the longitudinal direction of the vehicle and induces an undesired compliance steer effect.

On the other hand, with the suspension shown in FIG. 10 in order to unify the force transmission ratio and the lever ratio L2/L1, it is necessary to produce a damping force which is roughly $(L2/L1)^2$ times the piston speed. As the piston speed varies with that of the bell crank, the piston falls in the lower speed zone and the shock absorber is unable to provide the required damping effect. Further, if the diameter of the wheel is 620 mm then the hood becomes excessively high at a height which can be calculated to be about 750 mm.

Further, in JP-A-64-1612 the shock absorbers are arranged to project laterally out from the vehicle chassis and are connected by way of a triangular link member in a manner that vertical displacement of the road wheel is converted into lateral movement which compresses the shock absorber.

However, with this arrangement as the triangular link member is pivotally connected to a member which is rigid with the vehicle chassis, the lateral stroke which compresses the shock absorber is smaller than the corresponding vertical stroke. This results in the compression stroke of the shock abosrber being reduced to the degree that required damping degree cannot be achieved.

SUMMARY OF THE INVENTION

It is an object of the present invention to provide a suspension arrangement which simultaneously achieves the desired lever ratio and permits the level of the hood to be lowered.

A bell crank is pivotally mounted on a suspension link. One end of the bell crank is connected with an essentially horizontal shock absorber while the other is connected with a pull rod. As the road wheel undergoes vertical displacement the bell crank rotates while also undergoing vertical displacement along with the link it is mounted on. The lever ratio established between the shock absorber and the link thus changes.

More specifically, a first aspect of the invention comes in a vehicle suspension comprising: a link, the link having an inboard end pivotally connected to a vehicle chassis and an outboard end pivotally connected to a road wheel; a bell crank pivotally mounted on the link; a shock absorber, the shock absorber having one end pivotally connected to the vehicle chassis and a second end pivotally connected to the bell crank; and a pull rod, the pull rod being pivotally connected at one end to the chassis and pivotally connected at a second end to the bell crank.

A second aspect of the invention comes in a vehicle suspension comprising: a first ink operatively interconnecting a road wheel and a vehicle chassis; a second link operatively interconnecting the road wheel and the vehicle chassis, the second link being arranged below the first link; bell crank means pivotally mounted on the first link; a shock absorber, the shock absorber being pivotally connected at an inboard end to the vehicle chassis and at an outboard end to the bell crank means, the shock absorber having a spring which applies a bias to the bell crank means in a manner which tends rotate the bell crank means in a first rotational direction; and a pull rod, the pull rod being arranged to interconnect the bell crank means and the vehicle chassis in a manner which restrains the bell crank means against rotation due to the bias of the spring.

DETAILED DESCRIPTION OF THE PREFERRED EMBODIMENTS

Figure 1:
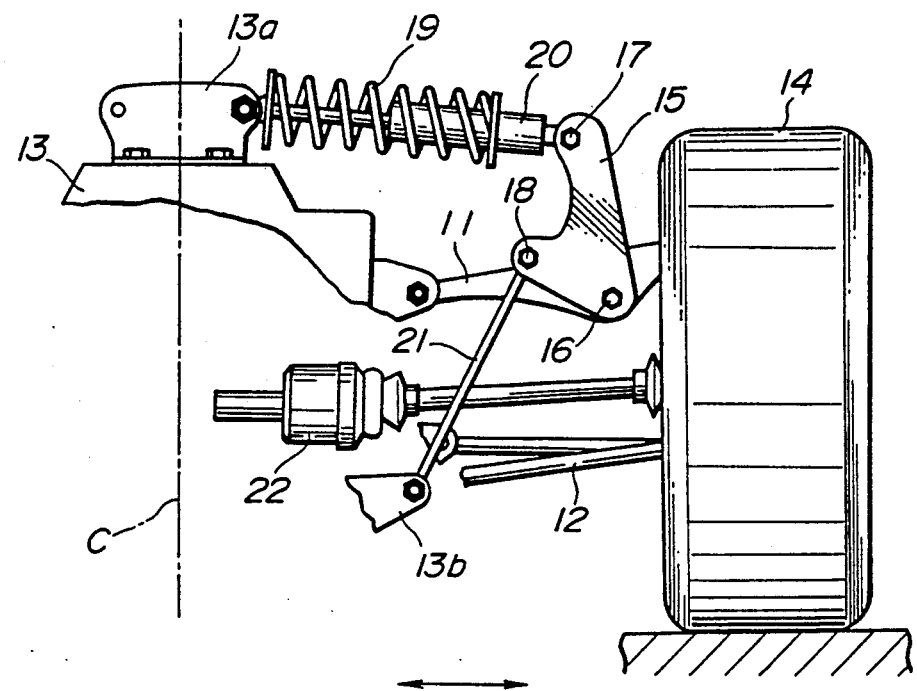
FIG. 1 is a front elevational view of a suspension according to the present invention.
Figure 2:
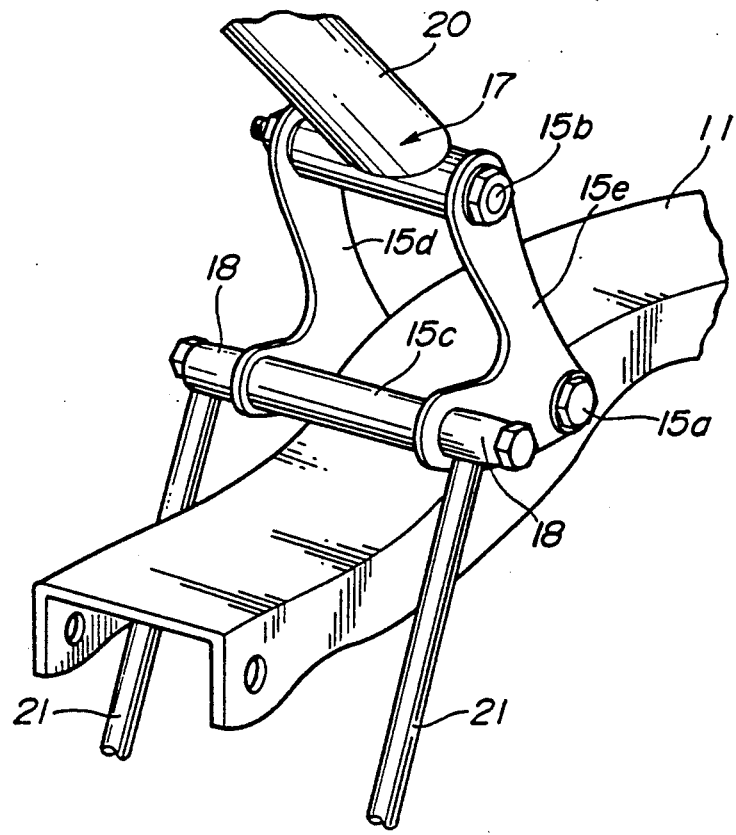
FIG. 2 is a perspective view showing a link arrangement which characterizes the arrangement shown in FIG. 1.

FIGS. 1 and 2 show an embodiment of the present invention. In this arrangement upper and lower links 11, 12 interconnect a vehicle chassis 13 with a road wheel 14. In this instance the upper and lower links take the form of A-arms and are pivotally connected to the chassis at their inboard ends by hinge type joints and pivotally connected at the outboard ends to a wheel support member by way of ball joints or the like (not shown).

A lower end of a triangular shaped bell crank 15 arrangement is pivotally mounted on the upper link 11 by way of a pivot 16. A shock absorber 20 is connected at its inboard end to the vehicle chassis by way of a bracket 13a and to an upper end of the bell crank arrangement 15 by way of pivot 17. A coil spring 19 is operatively disposed about the shock absorber 20 in a conventional manner.

Pull rods 21 (only one shown in FIG. 1) are connected to the bell crank 15 by way of a pivot 18 at their upper ends. The lower ends of the two pull rods 21 are connected to a bracket 13b rigid with the vehicle chassis.

As will become apparent, these pull rods 21 are such as only be subject to tractive or tensile forces and are not subject to compression. Therefore they can be relatively thin and therefore desirably light.

As shown in FIG. 2 the bell crank arrangement 15 in this embodiment is comprises of first and second shaped plates 15e and 15d. The pivots 16, 17 and 18 are comprised of bolt type pins 15a, 15b and 15c which extend between and interconnect the plates 15e and 15d. The pull rods are arranged to extend on either side of a drive shaft 22.

As will be appreciated from FIGS. 1 and 2, the shock absorber 20 and spring 19 are subject to compression which is a result of the locus tracted out by pivot 17. This locus of course varies with the vertical upward displacement of pivot 16 (which moves with the upper link 11) and the simultaneous downward displacement or pivot 18 which is produced by the tractive effect of the pull rods 21.

Figure 4:
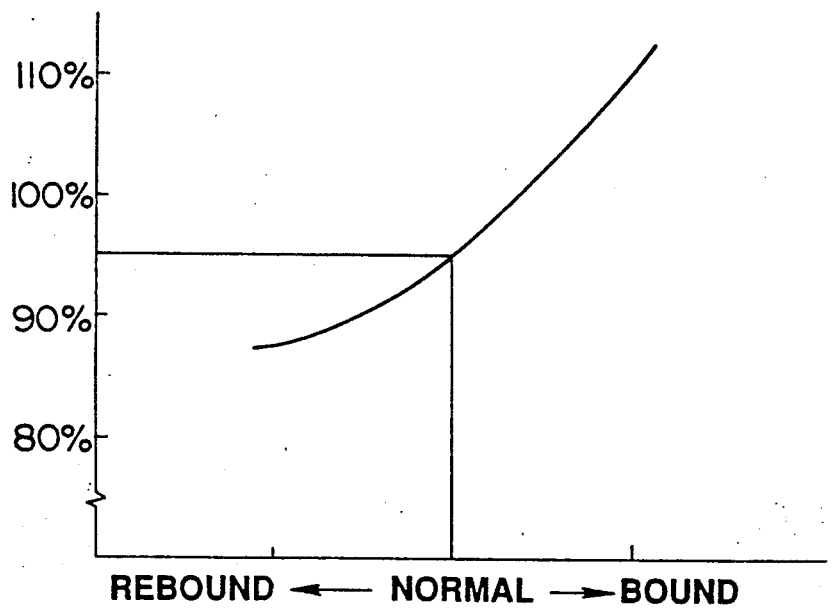
FIG. 4 is a graph which shows the efficiency characteristics of the coil spring used in the FIG. 1 suspension.
Figure 5:
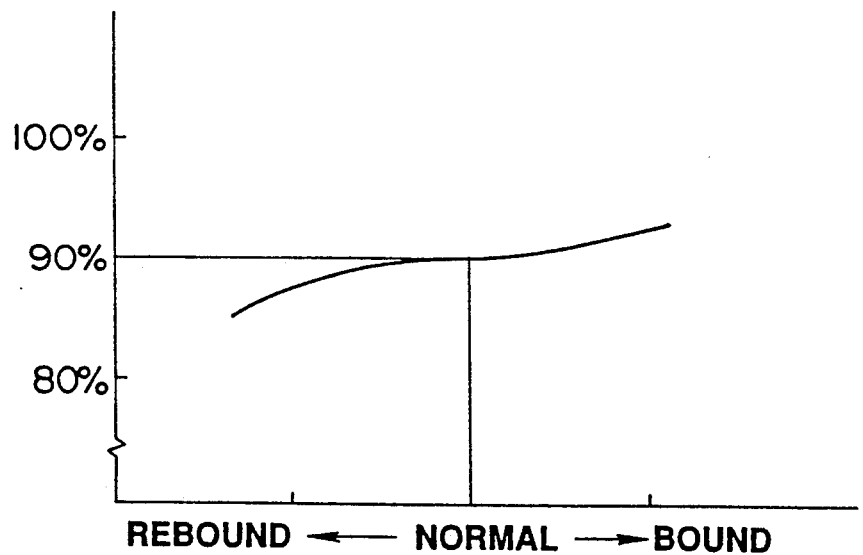
FIG. 5 is a graph which shows the efficiency characteristics of the shock absorber.
Figure 6:
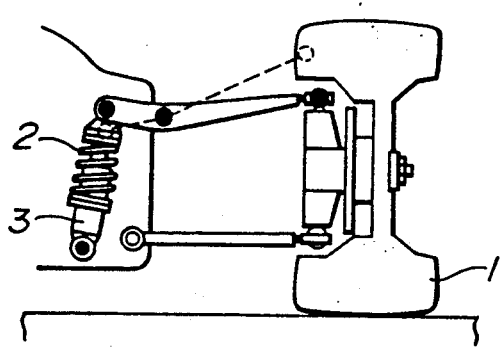
FIGS. 6 to 10 are elevational views showing the racing machine suspensions discussed in the opening paragraphs of the instant disclosure.
Figure 7:
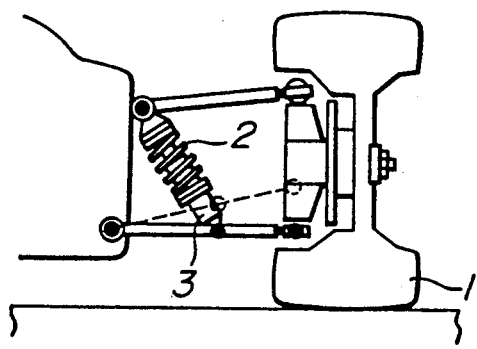
Figure 8:
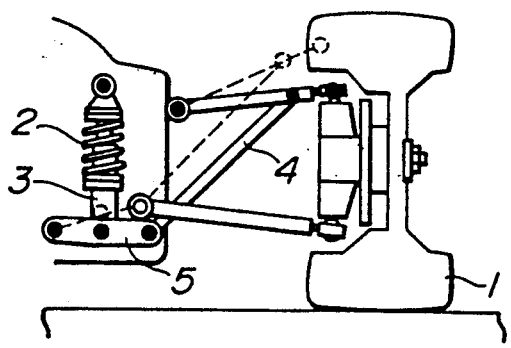
Figure 9:
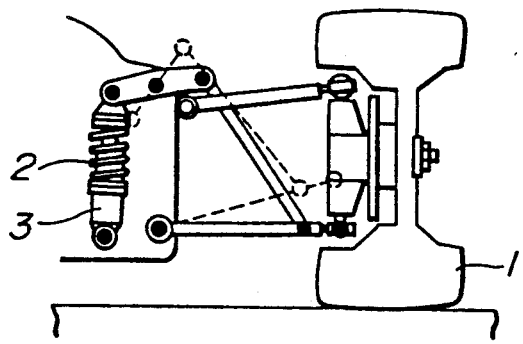
Figure 10:
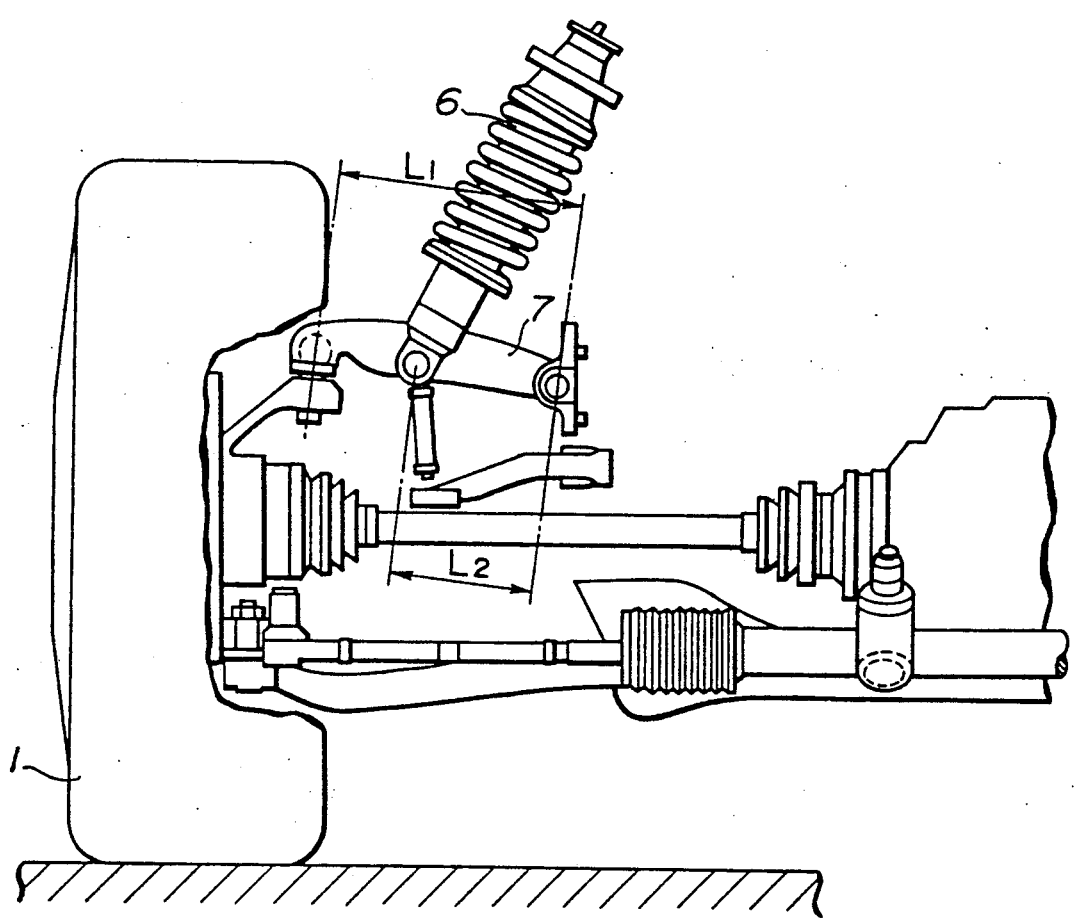

In other words, the bell crank arrangement rotates as at the same time it is subject to vertical displacement. Due to the upward and inward displacement of the pivot 17 which occurs with vertical upward displacement of the wheel center, the lever ratio (increases from 1.0 to a value > 1.0) and therefore induces the non-linear spring and damping characteristics shown in FIGS. 4 and 5. As will be appreciated from these figures, a spring efficiency which satisfies the L2/L1 lever ratio, and a shock absorber damping efficiency which meets the square of the lever ratio (viz., $(L2/L1)^2$) requirement, can be obtained.

Figure 3:
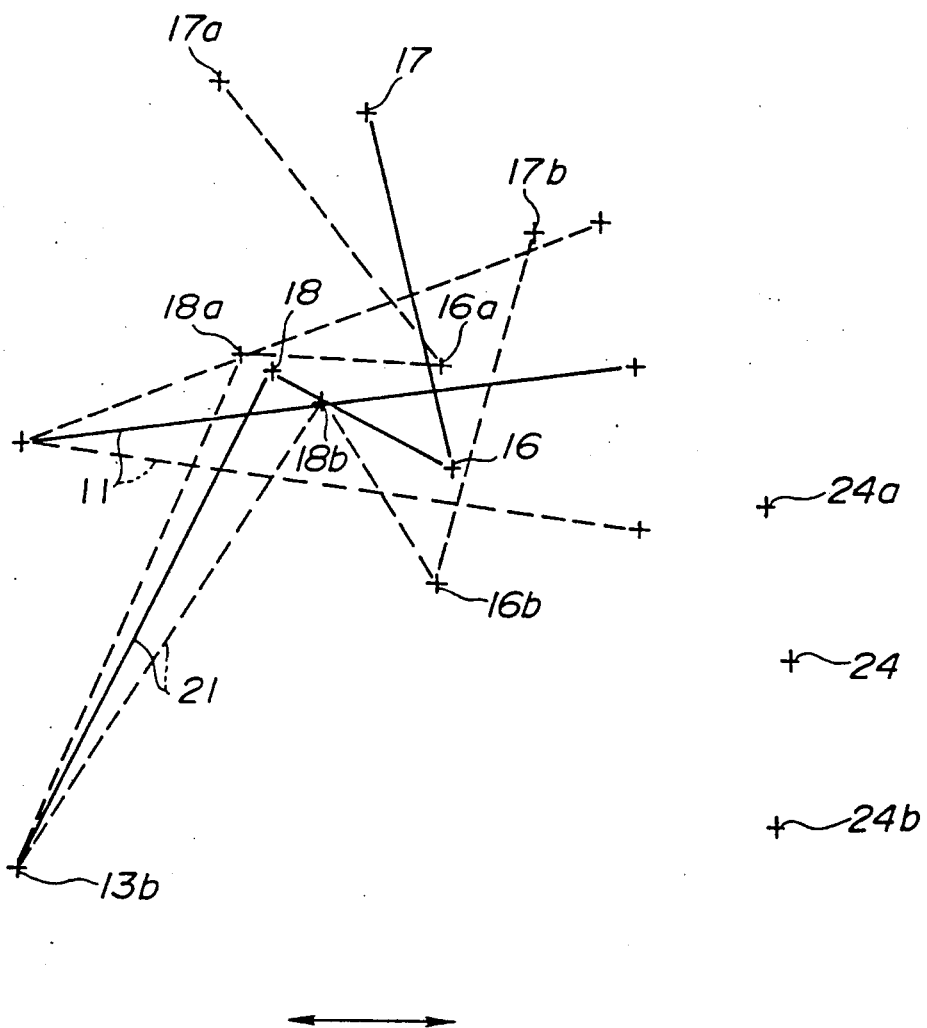
FIG. 3 is a diagram which depicts the operation of the embodiment of the invention.

FIG. 3 schematically shows the operational characteristics achieved with the above described embodiment. As will be clear from this figure, pivot 17 moves between points 17a and 17b in response to bound and rebound wherein the wheel center moves from 24→24a (full bound) and 24→24b (full rebound), respectively.

With the above described embodiment, in addition to the above merits, as the pull rods 21 and side members 15e and 15d are located on either side of the drive shaft 22, the bracket 31a to which the shock absorber 20 is connected, is not subject to any forces which will tend to bend the same and the tendency for compliance steer to occur as a result, is obviated.

Further, as the shock absorber can be arranged almost horizontally, the height of the hood can be lowered in a desired manner.

What is claimed is:

1. A vehicle suspension comprising:
   a link, said link having an inboard end pivotally connected to a vehicle chassis and an outboard end pivotally connected to a road wheel;
   a bell crank pivotally mounted on said link;
   a shock absorber, said shock absorber having one end pivotally connected to the vehicle chassis and a second end pivotally connected to said bell crank; and
   a pull road, said pull rod being pivotally connected at one end to the chassis and pivotally connected at a second end to said bell crank.

2. A vehicle suspension comprising:
   a first link operatively interconnecting a road wheel and a vehicle chassis;
   a second link operatively interconnecting the road wheel and the vehicle chassis, said second link being arranged below said first link;
   bell crank means pivotally mounted on said first link;
   a shock absorber, said shock absorber being pivotally connected at an inboard end to the vehicle chassis and at an outboard end to said bell crank means, said shock absorber having a spring which applies a bias to said bell crank means in a manner which tends rotate said bell crank means in a first rotational direction; and
   a pull rod, said pull rod being arranged to interconnect the bell crank means and the vehicle chassis in a manner which restrains the bell crank means against rotation due to the bias of the spring.

3. A suspension as claimed in claim 2 wherein said shock absorber is arranged essentially horizontally.

4. A suspension as claimed in claim 2 further comprising a second pull rod, said second pull rod being arranged to interconnect the bell crank means and the vehicle chassis in a manner which restrains the bell crank means against rotation due to the bias of the spring, said second pull rod being arranged in a spaced essentially parallel relationship with the first pull rod in a manner which permits a drive shaft to pass therebetween to the road wheel.

5. A vehicle suspension comprising:
   a first link operatively interconnecting a road wheel and a vehicle chassis;
   a second link operatively interconnecting the road wheel and the vehicle chassis;
   bell crank means pivotally mounted on said first link by way of a first pivot;
   a shock absorber, said shock absorber being pivotally connected at an inboard end to the vehicle chassis and at an outboard end to said bell crank means by way of a second pivot, said shock absorber having a spring which applies a bias to said bell crank means in a manner which tends to rotate said bell crank means in a first rotational direction; and
   a pull rod, said pull rod having an outboard end connected to said bell crank means by way of a third pivot and an inboard end connected to the vehicle chassis, the first, second and third pivots being so arranged that the bias which is applied to the bell crank by the spring of said shock absorber subjects the pull rod to a constant tensile force.

6. A vehicle suspension as claimed in claim 5 wherein the third pivot is located inboard of the first pivot, and the inboard end of the pull rod is connected to the vehicle chassis at a side which is distal from the side the inboard end of said shock absorber is connected to the vehicle chassis.

7. A vehicle suspension as claimed in claim 5 wherein said first, second and third pivots are arranged in a triangular formation and said shock absorber extends essentially horizontally between the chassis and the first pivot on said bell crank.

8. A vehicle suspension comprising:
 a link, said link having an inboard end pivotally connected to a vehicle chassis and an outboard end pivotally connected to a road wheel;
 A bell crank pivotally mounted on said link;
 a shock absorber, said shock absorber having one end pivotally connected to the vehicle chassis and a second end pivotally connected to said bell crank; and
 a pull rod, said pull rod being pivotally connected at one end to the chassis and pivotally connected at second end to said bell crank, said shock absorber and said pull rod defining means which constantly subjects said pull rod to a tractive force and prevents the application of compressive forces therealong.

* * * * *

UNITED STATES PATENT AND TRADEMARK OFFICE
CERTIFICATE OF CORRECTION

PATENT NO. : 5,080,389

DATED : January 14, 1992

INVENTOR(S) : Kawano et al.

It is certified that error appears in the above-identified patent and that said Letters Patent is hereby corrected as shown below:

Claim 1, column 4, line 14, change "road" to --rod--.

Claim 6, column 5, line 2, change "side" to --site-- (both occurrences).

Claim 8, column 6, line 1, change "A" to --a--.

Signed and Sealed this

Twenty-seventh Day of April, 1993

Attest:

MICHAEL K. KIRK

Attesting Officer

Acting Commissioner of Patents and Trademarks